Nov. 10, 1925.

W. H. BARBER

MICROPHONE BUTTON

Filed Dec. 15, 1921        2 Sheets-Sheet 1

INVENTOR:
Walter H. Barber
By
ATTORNEYS

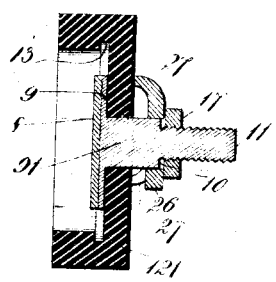
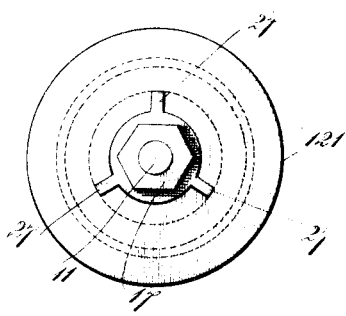
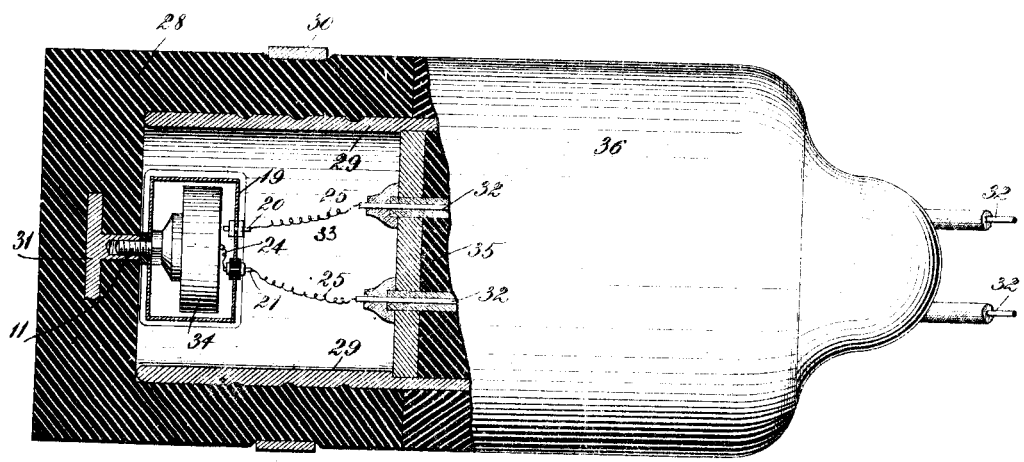

Patented Nov. 10, 1925.

1,560,643

UNITED STATES PATENT OFFICE.

WALTER H. BARBER, OF MELROSE, MASSACHUSETTS, ASSIGNOR TO SUBMARINE SIGNAL COMPANY, OF PORTLAND, MAINE, A CORPORATION OF MAINE.

MICROPHONE BUTTON.

Application filed December 15, 1921. Serial No. 522,500.

*To all whom it may concern:*

Be it known that I, WALTER H. BARBER, of Melrose, in the county of Middlesex and State of Massachusetts, a citizen of the United States, have invented a new and useful Improvement in Microphone Buttons, of which the following is a specification.

This invention relates to a receiving instrument for the detection of submarine sounds, and in particular to the reception by one ship of signals and communications from a distant ship or from a shore station, and to the detection of echoes from the ocean bottom, such as are used in sounding. In the past such signals have been detected by the use of acoustic devices in which a hollow body is placed in contact with the water, and a tube led from said body to the ear of the observer; or by the use of an electro-magnetic device, such as the oscillator and the magnetophone; or by the use of any one of a number of designs of watertight cases commonly called hydrophones containing granular carbon microphone buttons. In practice the various acoustic devices have proved too weak for use beyond a limited range. The electromagnetic devices have also proved weak unless used with an amplifier. Moreover, these devices possess an inherent pitch which changes or alters the characteristics of the incoming sound so that the incoming sound is frequently distorted and unnatural in quality.

The commonest method of detecting signals has been by the use of a hydrophone, the form of which has varied according to the type of signal to be received. Frequently, as in the case of submarine fog bells, the signals are all of the same pitch, and the detecting hydrophones have been designed to respond most readily to that pitch. In other cases, where the "signal" was the noise of a distant, perhaps hostile, ship, the watertight case or at least the active diaphragm of the case has been made of rubber in order that the characteristics of the signal may be transmitted as nearly as possible without distortion.

While a single hydrophone may be used successfully to detect a signal, it has been customary to use the hydrophones in matched sets of two or more instruments possessing the same pitch, or the same sensitiveness or the same rapidity of response to an incoming signal or a combination of these or other characteristics. One of the principal difficulties in the practical manufacture of hydrophones has been that of producing microphone buttons sufficiently uniform in their characteristics to admit of rapid and exact matching of the complete hydrophones into the necessary "sets." This is particularly true when the hydrophone is intended for use in the detection of signals originating in sources which do not have the same pitch, and in the detection of ships. What is needed is a button which can be manufactured so that sets of similar buttons can be easily obtained; in which all the buttons in a "set" shall possess similar characteristics at a given frequency, and the same characteristics at all frequencies in the practical range, say from 300 to 5,000 cycles per second. In the effort to supply this need some microphone buttons have been designed so as to be highly damped. In such buttons the natural pitch is pretty well eliminated, and the buttons respond with more or less uniform intensity at all frequencies, but such buttons are of necessity comparatively weak, since so much of the available energy is absorbed by the damping members.

It has also been sought to obtain the desired result by supporting the inertia element of the microphone button by the use of some inelastic substance such as paper, cloth or felt. Buttons of this type have proved too weak for practical use. Rubber has also been tried as the elastic material for the support of the inertia element of the button. Satisfactory results have been obtained by the use of rubber, but mechanical difficulties in the assembly of the button, due to the tendency of rubber to "creep" when clamped under pressure, have prevented the assembly of uniform buttons using this material.

In my invention I have adopted a combination of the damping method with the use of rubber as the supporting material for the inertia member of the button. The button is of the common design, in which two electrodes of conducting material, preferably polished carbon, are mounted with granular carbon between them. I supply the necessary amount of damping by placing a perforated felt washer under slight pressure between the carbon electrodes.

The cavities in this washer serve to hold the granular carbon between the electrodes. One of the electrodes is mounted in a metal cup, preferably by soldering, while the other is attached to a slightly larger rubber cup in any one of several methods hereinafter described.

My invention will be understood by reference to the drawings in which—

Figs. 6 and 7 show an alternative form of assembling the rubber cup and electrode.

Fig. 8 shows the button and its frame mounted in a rubber case forming a hydrophone.

Figure 1:
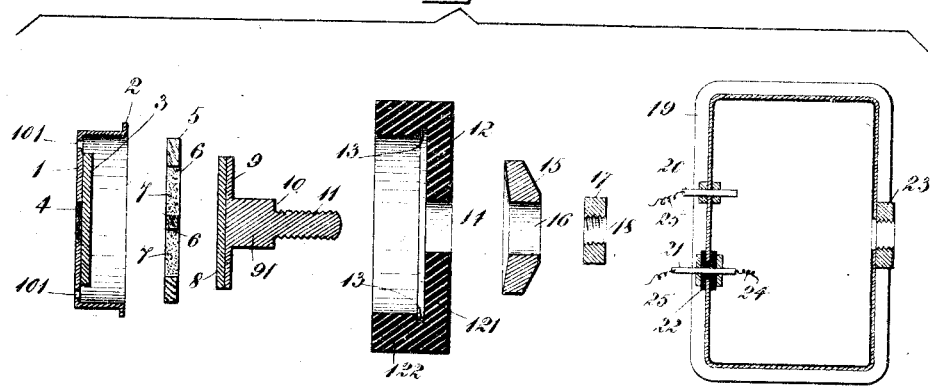
Figure 1 is a sectional view of the parts in their relative positions unassembled.
Figure 2:
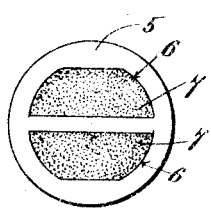
Fig. 2 is a plan view of the felt washer or spacer.
Figure 3:
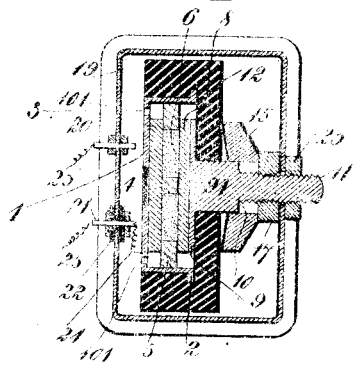
Fig. 3 shows the button in section assembled in a frame for mounting.

In the bottom of a metal cup 1 is fastened an electrode 3 of highly polished non-tarnishing metal, or preferably polished carbon, by means of a drop of solder 4. The metal cup 1 is provided with a narrow flange 2 and is perforated with several holes 101 which provide free circulation of air for cooling the button and prevent distortion of the button diaphragm by the increase of air pressure within the hydrophone case when it is submerged at a considerable depth. The circular felt washer 5 is perforated with elongated cavities 6, which are nearly full of granulated carbon 7. It fills the space between the electrode 3 and a second electrode 8 under a pressure determined by the amount of damping desired in the button.

Experiment has shown that, when a button containing this type of chamber for the carbon is mounted with the chambers or slots in a horizontal position, it will be much more uniform in sensitiveness than the ordinary type of button.

The second electrode 8 which may be of polished non-tarnishable metal, but is preferably of polished carbon, is soldered to a metal disk 9 provided with a stud 91 having a shoulder 10 and a threaded shank 11. A moulded rubber cup 121 has a recess 13 designed to fit over shoulder 2 on cup 1 when the button is assembled, and also a central hole 14 of such size as to just pass over the shoulder 10 and rest against the back of the disk 9. The cup 121 fits over the metal cup 1 and its side walls enclose the cup 1. The bottom 12 of the rubber cup serves as the diaphragm or active elastic supporting element for the inertia part of the button. A clamping member or washer 15 has a smooth hole 16 which just fits over the shoulder 10. The combined thickness of the diaphragm 12 and clamping member 15 is greater than the height of the shoulder 10 so that a locknut 17 with a threaded hole 18 may be applied to the threaded stud 11 to clamp the rubber diaphragm 12 with a definite pressure between the metal disk 9 and the clamping member 15. This pressure may be controlled by tightening nut 17 with a socket wrench employing a friction grip which releases at a predetermined pressure.

In assembly the felt washer 5 is placed in the cup 1 against the electrode 3, and the slots 6 are filled with the necessary amount of granular carbon 7. The shoulder 10 of the second electrode stud 91 is then passed through hole 14 of rubber piece 121 and hole 16 of clamping member 15, the locknut 17 being then screwed home. The sides 122 of the rubber piece 121 are then spread and slipped over the side of the metal cup until flange 2 engages in recess 13. This flange serves to hold the button together with the parts in their proper relative positions, but other or additional means may be used such as whipping or cementing. I prefer to mount the button in a square frame 19 containing two pins 20 and 21. Pin 20 is grounded electrically upon the yoke, while pin 21 is insulated from it by a bushing 22 of insulating material. The shank 11 electrically connected with the electrode 8 is screwed into the threaded nut 23 on the outside of the frame 19, while the other electrode 9 is connected by wire 24 with the insulated pin 21. The purpose of this yoke 19 is to provide mechanical protection to the button in handling, and to take up the strain of the lead wires 25 by means of which the button is connected with the outside electrical circuit. The exact manner of the use of this yoke is shown in Fig. 8. This yoke 19 may be omitted if the lead wires 25 are sufficiently soft and flexible, or another form may be used to obtain the same results.

Figure 4:
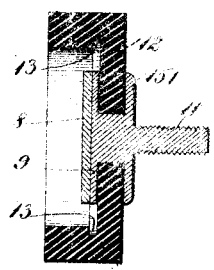
Figs. 4 and 5 are sections of two forms of the rubber cup with its electrode.
Figure 5:
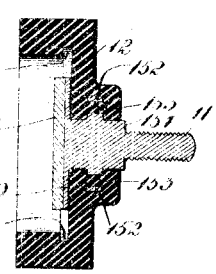

Figs. 4 and 5 show two methods of moulding the rubber cup and the electrode mount in one unit, so that the rubber need be under no strain except that due to the weight of the inertia element which it supports. In Fig. 4 the rubber is vulcanized under pressure between the disk 9 and a flange 151 carrying the shank 11. In Fig. 5 the rubber entirely surrounds a disk 152 and fills holes 153 so as to give a firm union between the rubber and the metal. In this case the threaded shank 11 stops at shoulder 154 so that the button may be mounted firmly on its support without exerting pressure on the rubber.

Figs. 6 and 7 show an alternative method of assembling the rubber cup 121 and the electrode stud 91. The metal stud consists as before of a disk 9 to which the electrode 8 is attached, and having a shoulder 10 and a threaded shank 11. The clamping washer 26 is of a diameter less than that of disk 9 and has three or more feet 27 so shaped as to bear on the rubber at a corresponding number of points opposite the edge of the disk 9. This method of clamping the rubber is positive and at the same time tends to break up any natural vibrations of the rubber diaphragm. Furthermore, the shape of the feet may be designed so as to produce a minimum distortion of the rubber due to pressure.

Fig. 8 shows one of the buttons mounted in a common type of hydrophone case. A gum rubber cup 28 is passed over a cylindrical metal sleeve 29, the joint between them being made watertight by cement and a clamping band 30. An anchor nut 31 is moulded into the bottom of the inside of the rubber cup 28 and serves as a support for the button 34, which is affixed to it by the threaded shank 11, the frame 19 being used or not as desired. The electrical connection of the button with the outside circuit is provided through two cables 32, 32 and two leads 25, 25, one connected to the insulated pin 21 and the other with the grounded pin 20 and yoke 19, all as above described. The cables 32, 32 are led into the hollow chamber 33 through a stuffing box 35, thus making the chamber 33 watertight. A second rubber member 36 is passed over the rear end of the metal sleeve 29 to make the assembly more symmetrical and to provide mechanical protection for the cables 32.

In the button assembly described the advantages of rubber are retained as a diaphragm material for supporting the inertia element and at the same time the mechanical difficulties heretofore experienced in the use of this material are avoided. Moreover, because of the use of the rubber diaphragm together with a certain amount of damping, this button is more nearly aperiodic than the types in common use, while at the same time it retains its sensitiveness to a high degree.

Although this form of button may be mounted directly upon the skin of the ship or in any of the usual forms of hydrophone cases, I prefer to mount it for the purpose of receiving communications from distant ships and shore stations employing sending devices of different pitches, in a form of case well known to those versed in the art, in which the entire outer cover of the case is of gum rubber, and in particular in which the active diaphragm of the case is of pure rubber. When the button is thus mounted the resulting hydrophone is more sensitive than many of the types now known, and in addition is practically free from a natural period of its own, permitting it to respond with equal facility to signals of different pitches and to reproduce the noise of distant ships without distortion.

In the specification above I have described the button in all cases mounted by the stud passing through the rubber diaphragm, but I do not limit myself in this respect, since equally good results have been obtained when the button is mounted by a stud attached to the metal cup. I have also described the cup-shaped diaphragm of the button and the two outer members of the case as being made of pure gum rubber, but any natural or synthetic material possessing similar characteristics may be used and the term "rubber" as used in the claims is intended to include similar material.

What I claim as my invention is:—

1. A microphone button comprising two electrodes, granular carbon located between said electrodes, and an unstretched rubber diaphragm, one of said electrodes being clamped to said diaphragm.

2. A microphone button comprising a metal cup having an electrode attached thereto and a rubber cap comprising a vibratory diaphragm and a flange projecting therefrom, a second electrode attached to said diaphragm to vibrate therewith, and granular conducting material located between said electrodes.

3. A microphone button comprising two electrodes, means for holding granular carbon between them, said granular carbon, a rubber diaphragm, a disk bearing a threaded stud, a clamping spider having a plurality of feet, and a locknut, one of said electrodes being attached to said disk, and said stud being passed through holes in the rubber diaphragm, clamping washer and locknut, whereby the tightening of the locknut causes the rubber diaphragm to be clamped between said spider and the disk with a minimum distortion of the rubber.

4. A microphone button comprising an unstretched rubber diaphragm and two electrodes, one of said electrodes being mounted upon said diaphragm whereby said button will have a low natural pitch.

5. A microphone button comprising a rubber diaphragm and two electrodes, one of said electrodes having one surface abutting the surface of said diaphragm and being firmly clamped thereto.

WALTER H. BARBER.